United States Patent [19]
Gokey

[11] Patent Number: 5,523,927
[45] Date of Patent: Jun. 4, 1996

[54] ILLUMINATED ANIMAL COLLAR

[76] Inventor: James A. Gokey, 3041 S. Bentley Ave., Los Angeles, Calif. 90034

[21] Appl. No.: 365,896

[22] Filed: Dec. 29, 1994

[51] Int. Cl.$^6$ ............................................. F21L 15/08
[52] U.S. Cl. ..................... 362/103; 362/276; 362/800; 362/802
[58] Field of Search ................................ 362/103, 104, 362/108, 276, 800, 802, 251; 119/859

[56] References Cited

U.S. PATENT DOCUMENTS

| | | | |
|---|---|---|---|
| 3,944,803 | 3/1976 | Chao ............................... | 362/108 |
| 4,173,201 | 11/1979 | Chao et al. ...................... | 362/103 X |
| 4,812,953 | 3/1989 | Ask et al. ........................ | 362/103 |
| 5,074,251 | 12/1991 | Pennock ......................... | 362/108 X |

*Primary Examiner*—Stephen F. Husar
*Attorney, Agent, or Firm*—Kimbell & Kimbell

[57] ABSTRACT

An illuminated collar. The illuminated collar includes a collar for placement on an animal, at least one light emitting diode placed on the outer exterior of the collar to be visible when the collar is worn, a motion sensitive switch designed to respond to the motion of the animal an on/off switch to selectively turn on or off battery power to the circuit, a battery, a timing circuit, and a low battery power detection circuit. The light emitting diodes, motion sensitive switch, on/off switch, battery, timing circuit and low battery detection circuit are connected together. The timing circuit is triggered by the open and close state of the motion sensitive switch which extinguishes illumination of the light emitting diodes after a predetermined duration, to thereby prevent constant and re-illumination of the light emitting diodes before the motion sensitive switch can change state from open to close again. An intermittent flashing of the light emitting diodes will thus be established for constant movement. The low battery detection circuit will sound an audible alarm to warn the user of a low battery. This feature is especially helpful for the visually impaired, when the device is used on seeing on dog collars.

14 Claims, 4 Drawing Sheets

5,523,927

ILLUMINATED ANIMAL COLLAR

BACKGROUND OF THE INVENTION

1. Field of the Invention

This invention relates to the field of safety devices, and more particularly to an illuminated animal collar.

2. Description of the Prior Art

The use of illuminated animal or pet collars will provide safety to the pet wearing it, i.e. a dog, and also to the pet owner walking the pet at night. Previous attempts to provide a collar with constant illumination have been made in the past. See for example U.S. Pat. No. 3,935,443 to Simmons. The Simmons device does not provide a means for extinguishing the illumination if it is constantly left on. The illuminated pet collars of the past have also utilized miniature filament bulbs. These light sources tend to require high energy to operate, which shortens their useful battery life. It has been previously known to provide an intermittent flashing illumination circuit for shoes. See for example U.S. Pat. No. 4,848,009 to Rodgers. The Rodgers device pertains to footwear only and does not provide a means to warn the user of a low battery.

There accordingly remains a need for an illuminated pet collar which has a relatively long battery life, and which has a sufficiently visible illumination source. It is also preferable to have a means to warn the user of a low battery, particularly when a collar will be used for seeing eye dogs and the like.

SUMMARY OF THE INVENTION

The present invention uses at least one light emitting diode (LED) located on the outer exterior of the animal collar, a switch designed to respond to the motion of the animal, a power source, a slide switch to disconnect the power from the rest of the circuit, and a timing circuit which is triggered by the open and close state of the switch which extinguishes the illumination after a predetermined duration. The timing circuit also prevents constant and/or re-illumination of the LEDs before the switch can change state from open to close again. Preferably, a low battery detection circuit with an audible alarm, is also provided.

The present invention is effective in partial or total darkness and will operate over a long period of time when long life batteries are used. Further advantages of the invention reside in its very low cost and more importantly in its use for the visually impaired, in which the audible low battery circuit will warn the visually impaired individual when the battery is low.

The LEDs require much less energy than the filament bulbs and can produce an extremely bright display depending on the type of LED used. Since the LEDs require less energy than filament bulbs, circuit components can be smaller, which is an important consideration for the animal collar.

The slide switch provides the means to disconnect the power source from the rest of the circuit if the user wishes to do so during daylight hours or during storage of the device. This can also be accomplished automatically using a photo transistor in which the photo transistor will sense light, i.e. the sun, and disconnect the power source from the rest of the circuit for as long as the bright light conditions persist. Alternately, both a slide switch and a photo transistor can be utilized to provide for maximum battery life.

There are many motion sensitive switches available to initiate or trigger the timing circuit. Two such devices which possess the qualities of size, ruggedness, and motion sensitivity include the mercury switch and the ball bearing switch. The ball bearing switch may be preferred due to the mercury switches environmental and health concerns.

The timing circuit, whether in an integrated circuit package or otherwise, provides the means to illuminate the LEDs for a predetermined duration, i.e. in an intermittent flashing mode when under constant motion, viz., when the animal is moving, as called upon by the motion sensitive switch. Using the timing circuit to limit the duration of illumination will prove beneficial by not constantly illuminating the LEDs and ultimately prolonging battery life. There are many alternatives available for a timing circuit that will only allow the light source to be illuminated when the switch changes to its closed state and terminate the LEDs after a predetermined duration, and require the triggering mechanism or switch to change state from open to close before triggering the circuit again.

The low battery detection circuit, whether in an integrated circuit package or otherwise, provides the means to energize the audible alarm and give a warning upon low battery power. Failure to design a circuit that would in itself require very little power consumption while the battery is still in good condition could also lead to shortened battery life. There are many alternatives available for a low battery detection circuit that will draw very little power while monitoring the battery's condition and turn on an audible alarm upon low battery power. This can be done by using two circuits; namely, first, a low battery detection circuit that will only turn on its output when a low battery threshold is reached, which in turn will drive second, a dormant timing circuit separate from the one mentioned above that will continuously turn on and off an audible alarm upon detection of low battery power, so long as the condition lasts.

BRIEF DESCRIPTION OF THE DRAWINGS

The following drawings illustrate preferred embodiments of the invention.

FIG. 2 is a fragmentary bottom view of the collar with a portion thereof exposed.

DETAILED DESCRIPTION OF THE INVENTION

Figure 1:
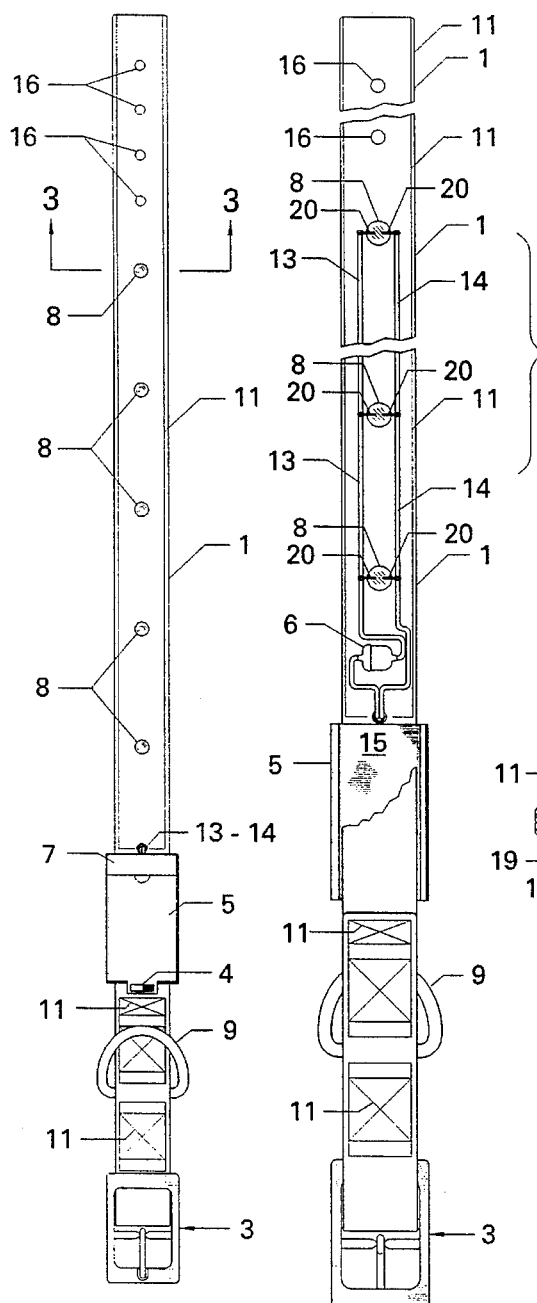
FIG. 1 is an outside plan view of the illuminated collar of the invention.

In FIG. 1, the main collar band 1 is a well known collar constructed of one continuous piece of nylon which is folded over once at the buckle 3 and once at the opposite end of the collar past the buckle adjustment holes 16. The remainder of the nylon collar is overlapped in the area of the leash ring 9 for added strength since this area is subjected to the most strenuous forces. A battery container 5 has an on/off switch 4 for connecting the battery contained therein to the motion sensitive LED circuit and is provided with a removable cover 7. The battery container 5 can be dimensioned to contain either single, multiple, or coin cell batteries. Once all these components are in place, the main collar band 1 is then sewn together with thread 11, or is sealed by some other means. A plurality of LEDs 8 are placed in space apart orientation on the collar 1 so that at least one LED 8 will be visible from any given orientation.

FIG. 2 shows a fragmentary enlarged view having a broken away portion, illustrating a motion sensitive switch, i.e. a mercury switch 6, in series with a plurality of LEDs 8 connected in parallel with common conductors 13 and 14, which are also connected to the battery in battery container 5.

Figure 3:
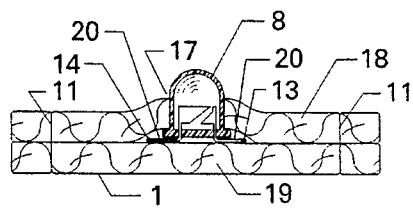
FIG. 3 is an enlarged cross sectional view taken through section line 3—3 of FIG. 1.

FIG. 3 illustrates how the LEDs 8 are secured in the main collar band 1. The LEDs 8 protrude through holes 17 in the outer facing main collar band 18 so that they are visible on the outer exterior thereof. The wires 13 and 14 are connected to LED terminals 20 and are passed between the outer facing main collar band 18 and the inner collar band 19, and are thus safely positioned there.

Figure 4:
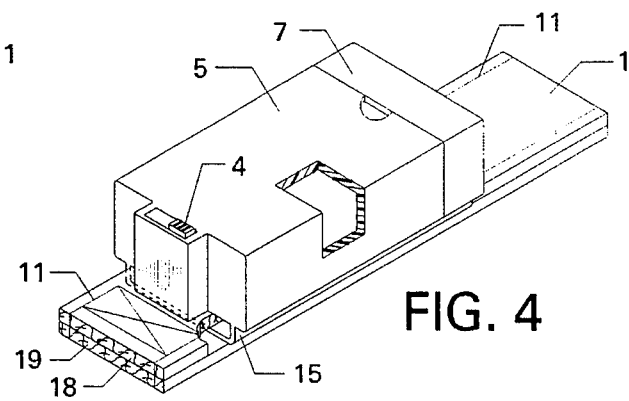
FIG. 4 is a fragmentary perspective view of the battery case attached to the collar of FIG. 1.

FIG. 4 illustrates the main collar band 1 and a rectangular mounting portion 15 for retaining the battery container 5 which in this illustration is adapted to receive a nine volt multi-cell battery (not shown) which has a high current density and will provide greater life than a small single-cell battery.

Figure 5:
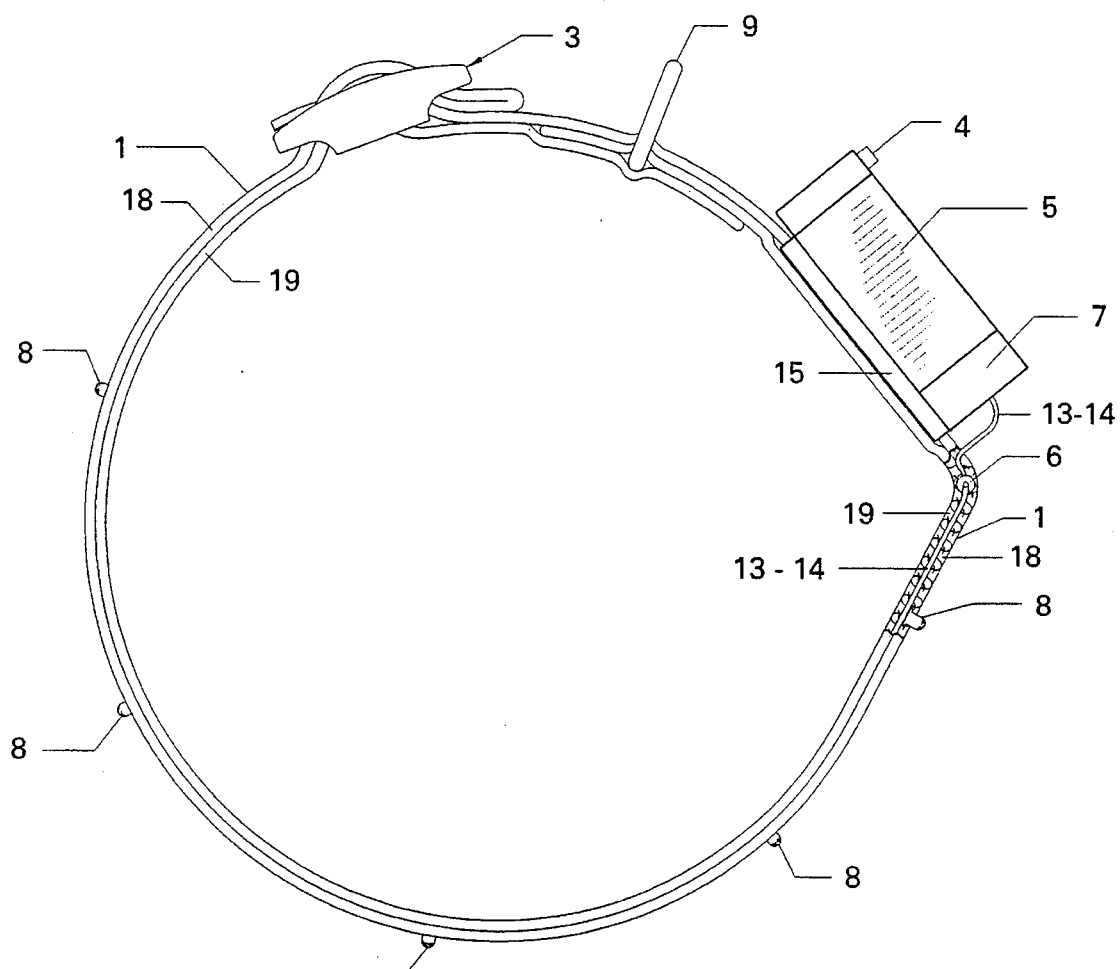
FIG. 5 is a side elevation of the collar in its normal buckled state.

FIG. 5 illustrates the collar assembly engaged with the buckle assembly 3. This view also shows the integral rectangular portion 15 for securing the battery container 5, as well as the spaced LEDs 8, which in this embodiment total 5. The battery, not shown, is connected to the mercury switch 6 and LEDs 8 in a series-parallel fashion by conductors 13 and 14.

Figure 6:
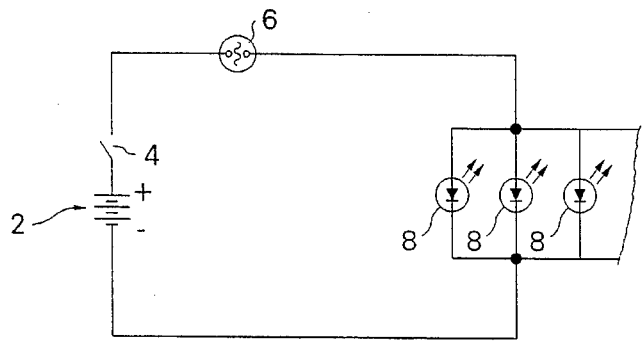
FIG. 6 shows a wiring diagram of a circuit without a timing circuit.

Referring now to FIG. 6, a simplied circuit diagram is shown in operation, with on/off switch 4 closed and motion sensitive switch 6 horizontal and stationary, the battery 2 will be disconnected from the rest of the circuit and the LEDs 8 will stay off. When motion is detected, this will cause the switch 6 to change state from open to close, thereby lighting the LEDs 8. The LEDs 8 will remain illuminated as long as the attitude of the switch 6 remains in the closed state and conversely maintain the LEDs 8 off as long as the attitude of the switch 6 remains in the opened state. Using this circuit can lead to shortened battery life where the collar's attitude remains in a position that maintains switch 6 in its closed state.

Figure 7:
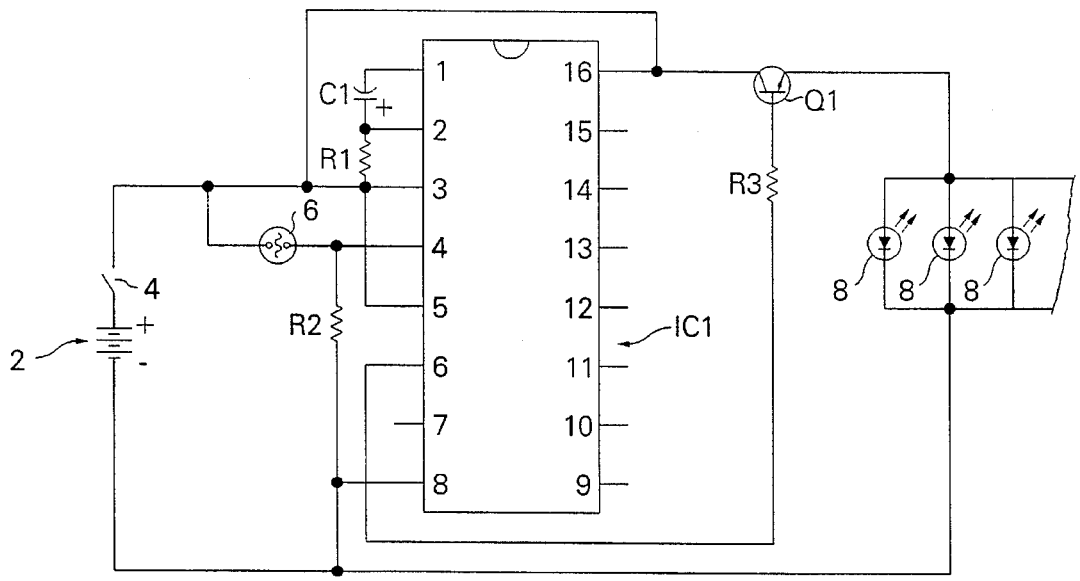
FIG. 7 shows an alternative circuit containing a timing circuit.

The following pertains to the circuitry in FIG. 7. Integrated circuit IC1 is a dual precision retriggerable/resettable monostable multivibrator (MC14538B) manufactured by Motorola. In operation, with on/off switch 4 closed and motion sensitive switch 6 horizontal and stationary, integrated circuit IC1 will be quiescent and the timing capacitor C1 will be charged through timing resistor R1 to the value of the battery 2 voltage. Timing capacitor C1 and timing resistor R1 make up the time constant or determine the duration of the output at pin 6. Pin 5 or trigger input A is held high or to the battery 2 voltage while pin 4 awaits a trigger or contact closure by switch 6. In this quiescent state, the integrated circuit IC1 is in a reset condition and pin 6 will be low or 0 volts which prohibits transistor Q1 from conducting and maintains the LEDs 8 in an off state.

When motion of the animal is detected, this will cause the motion sensitive switch 6 to change state from open to close. This will be recognized at pin 4 as a valid trigger or rise to the battery 2 voltage which causes IC1 to go into a "set" condition causing pin 6 to go high or to the battery 2 voltage. This causes transistor Q1 to conduct, thereby providing power to and lighting the LEDs 8. The output at pin 6 will be "on" for a time determined by timing components R1 and C1. After this predetermined "on" state, the circuit is returned to its reset condition where it awaits another valid trigger at pin 4. The circuit also requires pin 4 to see a change of state from close to open before a valid trigger can once again be detected. This is accomplished by the switch 6 changing its state from open to close.

Since the circuitry shown in FIG. 7 will only momentarily illuminate the LEDs 8 per motion sensitive switch 6 closure, the collar can be kept in any position while motionless. Thus, the life of the battery 2 will be extended. In addition, the circuit is designed so that switch 6 must alternate between its open and closed state in order to set and reset the integrated circuit IC1.

Figure 8:
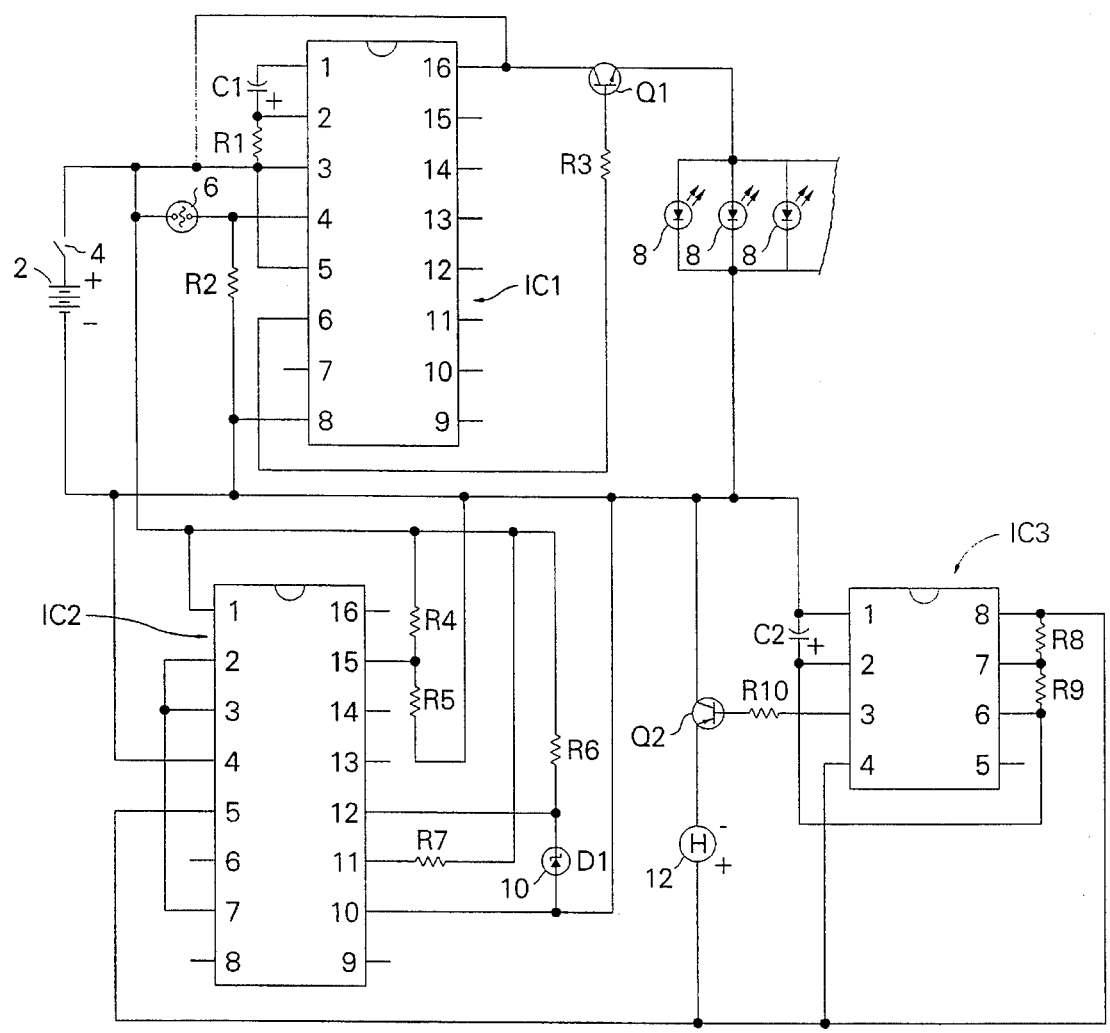
FIG. 8 shows an alternative circuit containing a timing circuit and a low battery detection and audible alarm circuit.

The need for an audible alarm upon low battery detection is essential for the illuminated animal collar as it pertains to the visually impaired. Since visually impaired individuals cannot determine when the battery 2 is low or dead, a means must be incorporated to warn the individual that a new battery is needed. FIG. 8 is a schematic drawings showing how low battery detection is incorporated into the circuitry of FIG. 7. While the timing circuit used to illuminate the LEDs 8 is performing its function, the low battery detection circuit is monitoring the battery voltage. The low battery detection circuit consists of two integrated circuits, viz., a voltage comparator circuit IC2 and the audible alarm timing circuit IC3. Integrated circuit IC2 is a micro-power comparator plus voltage follower (MC14578) manufactured by Motorola and integrated circuit IC3 is a 555 timer used as an oscillator. The following is an operational description of integrated circuit IC2. With the battery 2 voltage in good condition, a voltage reference is set up at pin 12 (inverting input) using resistor R6 and zener diode D1 and a voltage divider is set up at pin 15 (non-inverting input) using resistors R4 and R5. The zener diode D1 will hold the voltage at pin 12 constant provided that the battery 2 voltage does not fall below the zener reference value. The voltage divider at pin 15 will follow the battery 2 voltage as it drops. As long as the input voltage at pin 15 is greater than the input voltage at pin 12, the internal comparator output at pin 2 will remain low or at zero '0" volts. The resistor R7 at pin 11 is used to bias the internal comparator circuit. All unused inputs must be tied to the battery 2 voltage or ground. When the voltage at pin 15 drops below the voltage at pin 12, this will cause the effect of a positive voltage at pin 2 as long as the low battery condition lasts. The output at pin 5 will turn on or provide power to the integrated circuit IC3 which has remained de-energized up to this point.

The following is an operational description of integrated circuit IC3 as shown in FIG. 8. When power is provided to the integrated circuit IC3 at pin 8, it will operate as an astable oscillator. The oscillator is designed to continually repeat itself between a pre-determined duration of "on" and "off" states. The "on" state is determined by the combination of timing capacitor C2 charging to 66 percent the value of the battery 2 through timing resistors R8 and R9. During this charging cycle the integrated circuit IC3 will produce a positive voltage at pin 3, rendering the transistor Q2 non-conducting and maintaining the audible horn 12 "off." When this charging cycle has completed, the integrated circuit IC3 will then go into its discharge or "off" state. The "off" state is determined by the combination of timing capacitor C2 discharging to 33 percent the value of the battery 2 through timing resistor R9. This discharging cycle causes pin 3 to go to "0" volts causing transistor Q2 to conduct turning the audible horn 12 "on" for the duration of the "off" state. Until the low battery is replaced or drops to a value that will no longer power the illuminated collar components, the audible horn will continue to sound, warning the user of impending power failure. The audible horn 12 can be any signaling device, however for size, minimum power consumption, and sound production, a piezoelectric buzzer is recommended.

It is obvious that it is within the scope of the invention to utilize other circuitry, integrated or otherwise, to be motion activated and to limit the duration of the illumination of LEDs 8. Circuits to limit the duration of the LED's illumination are very important for the reasons previously explained. It is also obvious that within the scope of the invention to utilize other circuitry, integrated or otherwise, to monitor battery voltage and provide an audible means to warn the user in the event of a low battery condition. This is imperative as it pertains to the visually impaired as previously explained.

Obviously there is no limitation as to the types of collars with which the invention may be used. Thus the collar would include animal collars, guide dog collars for the blind, general safety collars, etc. and whether designed for sports, fashion, or utilitarian use. Besides being used for pets, the collar of the invention would find general use for people as well, engaged in motion activities in dark conditions.

The drawings and the foregoing description are not intended to represent the only form of the invention in regard to the details of their construction and manner of operation. In fact, it will be evident to one skilled in the art that modifications and variations may be made without departing from the spirit and scope of the invention. Although specific terms have been employed, they are intended in a generic and descriptive sense only and not for purpose of limitation, the scope of the invention being delineated in the claims which follow.

I claim:

1. An illuminated collar, comprising:

a collar for placement on an animal;

at least one light emitting diode placed on an exterior of said collar to be visible when the collar is worn;

a motion sensitive switch designed to respond to the motion of the animal;

a power source; and a timing circuit, said at least one light emitting diode, motion sensitive switch, power source, and said timing circuit being connected together, said timing circuit being triggered by the open and close state of the motion detection switch which extinguishes illumination of the at least one light emitting diode after a predetermined duration, to thereby prevent constant and re-illumination of the light emitting diodes before the motion sensitive switch can change state from open to close again.

2. The illuminated collar of claim 1, further comprising a low power source detection circuit with an audible alarm, to provide warning that the power source is low.

3. The illuminated collar of claim 1, wherein the motion sensitive switch is selected from the group consisting of a mercury switch and a ball bearing switch.

4. The illuminated collar of claim 1, wherein the timing circuit provides means to illuminate the light emitting diodes for a predetermined duration in an intermittent flashing mode, so long as motion of the collar is detected.

5. The illuminated collar of claim 1, wherein the power source is a battery.

6. The illuminated collar of claim 1, wherein the light emitting diodes are placed on said collar to protrude from the outer exterior surface of the collar.

7. The illuminated collar of claim 2, wherein the low power source detection circuit comprises a low battery detection circuit that will only turn on its output when a low power threshold is reached, which in turn will drive a second, dormant timing circuit that will continuously turn on and off an audible alarm upon detection of low battery power.

8. The illuminated collar of claim 1, further comprising an on/off switch to selectively connect the power source to the at least one light emitting diode.

9. An illuminated collar, comprising:

a collar for placement on an animal;

at least one light emitting diode placed on an exterior of said collar to be visible when the collar is worn;

a motion sensitive switch designed to respond to the motion of the animal;

an on/off switch;

a battery power source;

a timing circuit, said at least one light emitting diode, motion sensitive switch, on/off switch, battery power source, and said timing switch being connected together, said timing circuit being triggered by the open and close state of the motion detection switch which extinguishes illumination of the at least one light emitting diode after a predetermined duration, to thereby prevent constant and re-illumination of the light emitting diodes before the motion sensitive switch can change state from open to close again; and a low battery detection circuit with an audible alarm, to provide warning that the power source is low.

10. The illuminated collar of claim 9, wherein the timing circuit provides means to illuminate the light emitting diodes for a predetermined duration in an intermittent flashing mode, so long as motion of the collar is detected.

11. The illuminated collar of claim 9, wherein the low power source detection circuit comprises a low battery detection circuit that will only turn on its output when a low power threshold is reached, which in turn will drive a second, dormant timing circuit that will continuously turn on and off an audible alarm upon detection of low battery power and so long as the condition lasts.

12. The illuminated collar of claim 9, wherein the motion sensitive switch is selected from the group consisting of a mercury switch and a ball bearing switch.

13. The illuminated collar of claim 9, wherein the timing circuit provides means to illuminate the light emitting diodes for a predetermined duration in an intermittent flashing mode, so long as motion of the collar is detected.

14. The illuminated collar of claim 9, wherein the light emitting diodes are placed on said collar to protrude from the outer exterior surface of the collar.

* * * * *